US012552641B2

(12) United States Patent
Lo Jacono

(10) Patent No.: US 12,552,641 B2
(45) Date of Patent: Feb. 17, 2026

(54) DOOR SYSTEM FOR AN ELEVATOR CAR, ELEVATOR SYSTEM AND METHOD FOR EVACUATING AN ELEVATOR CAR

(71) Applicant: Inventio AG, Hergiswil (CH)

(72) Inventor: Romeo Lo Jacono, Gravesano (CH)

(73) Assignee: INVENTIO AG, Hergiswil (CH)

( * ) Notice: Subject to any disclaimer, the term of this patent is extended or adjusted under 35 U.S.C. 154(b) by 0 days.

(21) Appl. No.: 18/843,762

(22) PCT Filed: Feb. 15, 2023

(86) PCT No.: PCT/EP2023/053760
§ 371 (c)(1),
(2) Date: Sep. 4, 2024

(87) PCT Pub. No.: WO2023/169787
PCT Pub. Date: Sep. 14, 2023

(65) Prior Publication Data
US 2025/0178868 A1 Jun. 5, 2025

(30) Foreign Application Priority Data
Mar. 11, 2022 (EP) .................................... 22161554

(51) Int. Cl.
*B66B 13/24* (2006.01)
*B66B 13/04* (2006.01)
*B66B 13/08* (2006.01)

(52) U.S. Cl.
CPC .............. *B66B 13/24* (2013.01); *B66B 13/04* (2013.01); *B66B 13/08* (2013.01)

(58) Field of Classification Search
CPC .......... B66B 13/04; B66B 13/24; B66B 13/08
See application file for complete search history.

(56) References Cited

U.S. PATENT DOCUMENTS 1,852,608 A 4/1932 Grable
4,565,030 A 1/1986 LaSance
5,486,026 A * 1/1996 Borgardt ............. E05B 65/0876 49/141
6,058,665 A * 5/2000 Halvorson, Jr. ........ E06B 1/524 49/260
(Continued)

FOREIGN PATENT DOCUMENTS

CN 206278802 U 6/2017
CN 112456286 A * 3/2021 ............. B66B 5/027
(Continued)

*Primary Examiner* — Diem M Tran
(74) *Attorney, Agent, or Firm* — Shumaker, Loop & Kendrick, LLP

(57) ABSTRACT

A door system for an elevator car includes: at least one door leaf for closing a partial region of a car opening of the elevator car; and a mounting device that mounts the door leaf on the car slidably in a direction of a sliding axis between an open position, in which the door leaf releases the partial region, and a closed position, in which the door leaf closes the partial region, and additionally mounts rotatably about a rotation axis so that the door leaf, when slid into the closed position and/or into an intermediate position between the open position and the closed position, can be rotated into an emergency open position in which the car opening is released to an extent that the can be evacuated via the car opening.

17 Claims, 2 Drawing Sheets

(56) References Cited

U.S. PATENT DOCUMENTS

| | | | | |
|---|---|---|---|---|
| 9,284,159 | B2 | 3/2016 | Koskelainen | |
| 10,280,678 | B1 | 5/2019 | Rendon, Jr. et al. | |
| 2025/0163740 | A1 * | 5/2025 | Harrell | E05D 15/0652 |

FOREIGN PATENT DOCUMENTS

| | | | | | |
|---|---|---|---|---|---|
| CN | 113387262 | A | * | 9/2021 | B66B 13/30 |
| CN | 118790859 | A | * | 10/2024 | B66B 13/14 |
| JP | 07301049 | A | * | 11/1995 | |
| WO | 2008108725 | A1 | | 9/2008 | |
| WO | WO-2016062842 | A1 | * | 4/2016 | B66B 13/08 |

* cited by examiner

DOOR SYSTEM FOR AN ELEVATOR CAR, ELEVATOR SYSTEM AND METHOD FOR EVACUATING AN ELEVATOR CAR

FIELD

The present invention relates to a door system for an elevator car. Furthermore, the invention relates to an elevator system comprising at least one elevator car equipped with such a door system, as well as to a method for evacuating an elevator car equipped with such a door system.

BACKGROUND

An elevator car of an elevator system, such as can be used to transport people or goods in buildings, can comprise a car opening and a sliding door mechanism, which releases or closes the car opening to the particular floors of the building by horizontally sliding one or more door leaves. In addition to the car opening, the elevator car may have a separate emergency opening, through which the elevator car can be evacuated in an emergency.

U.S. Pat. No. 9,284,159 B2 shows an example of a separate side emergency opening, which can be closed via a pivoting door.

In embodiments without such an emergency opening, evacuation can take place via the car opening. However, in the event of a malfunction, the elevator car may become stuck at a point in the elevator shaft where the door leaf or leaves cannot be pushed open or cannot be pushed open far enough, for example because the sliding path is blocked by a support in the elevator shaft.

SUMMARY

There may therefore be a need for an improved door system for an elevator car that allows evacuation through the car opening even if sliding open the door leaf or leaves is not possible for any reason. Furthermore, there may be a need for a corresponding elevator system and a corresponding method for evacuating an elevator car.

These needs can be met by the subject matter of the advantageous embodiments defined in the following description and in the accompanying drawings.

A first aspect of the invention relates to a door system for an elevator car which is movable in an elevator shaft between several floors and has at least one car opening. The door system comprises at least one door leaf for closing at least a partial region of the car opening and a mounting device, which is designed to mount the door leaf on the elevator car slidably in the direction of a sliding axis between an open position, in which the door leaf releases the partial region, and a closed position, in which the door leaf closes the partial region, and additionally rotatably about a rotation axis so that the door leaf, when it is slid into the closed position and/or into an intermediate position between the open position and the closed position, can be rotated into an emergency open position, in which the car opening is released to such an extent that the elevator car can be evacuated via the car opening.

This makes it possible, with relatively little design effort, for the car opening to be at least partially released (and without the use of destructive force) even if the sliding path of the door leaf or leaves is blocked for any reason, for example because the elevator car has stopped at the unfavorable height of a support crossing the elevator shaft. This can, for example, be at a retaining clip of the guide rail.

A second aspect of the invention relates to an elevator system. The elevator system comprises an elevator shaft and at least one elevator car, which is movable in the elevator shaft between several floors and has at least one car opening. The elevator car comprises at least one door system as described above and below, wherein the door leaf is mounted via the mounting device on the elevator car slidably in the direction of the sliding axis between the open position and the closed position and additionally rotatably about the rotation axis.

A third aspect of the invention relates to a method for evacuating an elevator car of an elevator system as described above and below. The method comprises at least the following step: if the elevator car is to be evacuated via the car opening and the door leaf is slid into the closed position and/or an intermediate position between the open position and the closed position (and, for example, blocked therein): rotating the door leaf about its rotation axis into an emergency open position, in which the car opening is released to such an extent that the elevator car can be evacuated via the car opening.

Features of the method can also be features of the door system described above and below and/or of the elevator system described above and below, and vice versa.

Without restricting the scope of the invention in any way, embodiments of the invention may be considered to be based on the concepts and findings described below.

The car opening can be a main opening of the elevator car through which passengers can enter the elevator car from a floor and/or exit it to a floor during normal operation of the elevator system. For example, the car opening may be opposite a door opening in a side wall of the elevator shaft when the elevator car regularly stops at a floor. The elevator car can also have several car openings, for example opposite one another, wherein each car opening can be combined with a door system as described above and below.

The rotation axis can, for example, be orthogonal to the sliding axis. For example, the rotation axis in the operational state of the elevator car can be a vertical axis.

The rotation axis can, for example, be slidable together with the door leaf in the direction of the sliding axis (see also further below).

The rotation axis can intersect the sliding axis or can be offset laterally, for example horizontally, to the sliding axis. The orientation of the rotation axis relative to the sliding axis can be constant when sliding the door leaf between the open position and the closed position. However, it is also conceivable to change the lateral offset of the rotation axis to the sliding axis depending on the sliding path of the door leaf.

The door leaf may only be mountable rotatably about a single rotation axis. However, embodiments in which the door leaf can be mounted rotatably or pivotably about two or more rotation axes are also conceivable.

For example, the door leaf can comprise several slidable door leaf segments, each of which can additionally be mounted rotatably about its own rotation axis. Such an embodiment would allow a door leaf that is not completely closed, in particular a door leaf in the middle between the open position and the closed position, to be rotated about its rotation axis into an emergency open position.

According to one embodiment, the mounting device can comprise at least one folding part and at least one sliding part. The sliding part can be mountable on the elevator car slidably in the direction of the sliding axis between the open position and the closed position, wherein the folding part can be mountable on the sliding part rotatably about the rotation axis so that the folding part can be slid together with the sliding part. Furthermore, the door leaf can be fastenable to the folding part so that the door leaf can be rotated together with the folding part.

The folding part and/or the sliding part can be designed in one or more parts, for example in the form of an elongate profile or a strip.

The sliding part can, for example, be designed as a guide shoe for guiding in a corresponding guide rail, which can be arranged above and/or below the car opening.

The folding part can be fastened to the door leaf as a separate part, for example by screwing and/or welding. However, the folding part can also be integrated into the door leaf, i.e., both can be different portions of one and the same component manufactured in one piece.

According to one embodiment, the folding part can be elongate and can be rotatably connectable to the sliding part at its first end. For example, the longitudinal axis of the (elongate) folding part can run horizontally when the elevator car is in the operational state. It is possible that the longitudinal axis of the folding part runs parallel to the sliding axis in an initial position and forms an obtuse, acute or right angle with the sliding axis in the emergency open position.

Likewise, for example, the sliding part can be elongate and have a longitudinal axis that runs horizontally when the elevator car is in the operational state. The orientation of the longitudinal axis of the sliding part to the sliding axis can be constant or can vary when sliding between the open position and the closed position. Thus, the mounting device can be implemented with little design effort. The door system can therefore be easily retrofitted.

According to one embodiment, the folding part can be rotatably connectable to the sliding part via a mounting bolt which engages partially in the folding part and partially in the sliding part. For example, the longitudinal axis of the mounting bolt can lie on the rotation axis when the door system is in the assembled state. Such a mounting is robust and allows easy assembly (or disassembly) of the door system. Alternatively or additionally, the folding part can be rotatably mounted via at least one hinge.

According to one embodiment, the folding part can be lockable to the sliding part, wherein rotation of the folding part about the rotation axis is prevented in the locked state of the folding part and is made possible in the unlocked state of the folding part. This prevents the folding part, and thus the door leaf, from accidentally being rotated into the emergency open position.

According to one embodiment, the folding part can be locked to the sliding part via at least one locking bolt, wherein the locking bolt engages partially in the folding part and partially in the sliding part in the locked state and does not engage in the folding part, does not engage in the sliding part or neither in the folding part nor in the sliding part in the unlocked state. The locking bolt can engage in a corresponding locking receptacle on the folding part and/or sliding part, for example in the form of a locking opening. Accordingly, the folding part can be unlocked by moving the locking bolt out of the locking receptacle. Locking and/or unlocking can take place manually and/or automatically.

According to one embodiment, the locking bolt can engage in a second end of the folding part in the locked state. In this case, the folding part can, for example, extend over the entire or a large part of the width of the door leaf, wherein "width" can be understood as an extension of the door leaf in the horizontal direction in the operational state of the elevator car. In other words, the mounting bolt and the locking bolt can be arranged at opposite ends of the door leaf, as viewed in the horizontal direction or in the direction of the width of the door leaf.

According to one embodiment, the locking bolt can be displaceable, in particular slidable, between an unlocking position associated with the unlocked state and a locking position associated with the locked state. In this case, the locking bolt can be couplable to a spring mechanism, which can be designed to apply a restoring force, acting in the direction of the locking position, to the locking bolt coupled to the spring mechanism. For example, in the operational state of the elevator car, the locking bolt can have a longitudinal axis that is parallel or orthogonal to the longitudinal axis of the mounting bolt and/or to the rotation axis. However, other orientations of the locking bolt are also possible. The unlocking position and the locking position can be specified by a corresponding mechanical stop. The restoring force can be a spring force applied via at least one spring. Thus, the locking bolt can only be moved from the locking position to the unlocking position by overcoming the restoring force. This prevents the folding part from being unlocked accidentally, for example due to mechanical shocks. The restoring force also causes the locking bolt to return to the locking position on its own when released, which simplifies locking.

According to one embodiment, the locking bolt can be connectable to an elongate traction means and can be displaceable or slidable from the locking position to the unlocking position by pulling on the traction means connected to the locking bolt. The traction means can be a flexible means of sufficient tensile strength, such as a rope or wire. When the door system is in the assembled state, the traction means can be accessible from inside and/or outside the elevator car. For example, the traction means can be suitably protected against unauthorized access during normal operation of the elevator system. Such a locking mechanism or actuating mechanism is particularly low-maintenance and only requires little space.

According to one embodiment, the mounting device can also comprise a further folding part and a further sliding part. The further sliding part can be mountable on the elevator car slidably in the direction of the sliding axis between the open position and the closed position, wherein the further folding part can be mountable on the further sliding part rotatably about the rotation axis so that the further folding part can be slid together with the further sliding part. Furthermore, the door leaf can be fastenable at its first end to the folding part and at its second end to the further folding part so that the door leaf can be rotated together with the folding part and the further folding part. For example, in the operational state of the elevator car, as viewed in the vertical direction, the first end can be an upper end of the door leaf and the second end can be a lower end of the door leaf. The door leaf can, for example, rigidly connect the folding parts to one another. For this purpose, the door leaf can be designed to be appropriately torsionally rigid. As indicated above, the folding parts can at least partially enclose the door leaf in the horizontal direction. However, it is also possible that at least one of the folding parts additionally encloses the door leaf at least partially in the vertical direction. For example, the folding parts can also surround the door leaf like a frame. The door leaf can thus be mounted very stably with relatively little design effort.

In particular, when closed, the sliding part can close at least part of the car opening. In particular, the sliding part, as an upper sliding part, can close an upper edge region of the door opening in the emergency open position, and/or the further sliding part, as a lower sliding part, can close a lower edge region of the door opening in the emergency open position. The fact that both the upper sliding part and the lower sliding part remain in the emergency open position has the advantage that the locking bolt fastened thereto is easily accessible and that the sliding part can be designed to be stable. According to one embodiment, the door system can furthermore comprise at least one further door leaf for closing a further partial region of the car opening. Accordingly, the mounting device can furthermore be designed to mount the further door leaf on the elevator car slidably in the direction of the sliding axis between an open position, in which the further door leaf releases the further partial region, and a closed position, in which the further door leaf closes the further partial region, and/or rotatably about a further rotation axis parallel to the rotation axis. The door leaves can, for example, be a left and a right door leaf, wherein the car opening in the operational state of the elevator car can be closed by moving the door leaves toward one another in opposite directions or can be released by moving the door leaves away from one another in opposite directions. It is also possible that both door leaves can be slid in the same direction from the same side of the car opening and/or toward the same side of the car opening. This embodiment makes it possible, for example, for more than one door leaf to be rotated into the emergency open position. This reduces the risk that the car opening cannot be opened wide enough in the event of an evacuation.

For example, the door leaves can rotate independently of one another about their rotation axes.

According to one embodiment, the door leaf can first be unlocked by unlocking the folding part and then be rotated into the emergency open position. The fact that the door leaf must first be unlocked prevents the door leaf from being accidentally opened during normal operation of the elevator system.

According to one embodiment, the door leaf can be pivoted into the elevator car when rotated into the emergency open position. The door leaf can thus largely project into the elevator car in the emergency open position. This can be advantageous in narrow elevator shafts. Additionally or alternatively, the door leaf can be rotated about a vertical axis as the rotation axis. Accordingly, the door leaf or leaves can be mounted slidably in the direction of a horizontal axis as the sliding axis.

Preferably, a single door leaf can be rotated into the emergency open position at any one time. In the case of telescopic sliding doors with several telescopically moving door leaves, it is preferable that only the frontmost door leaf can be rotated into the emergency open position. This is enough to evacuate the passengers from the car.

Advantageous embodiments of the invention are described in more detail below with reference to the accompanying drawings, wherein neither the drawings nor the description are intended to be interpreted as limiting the invention in any way.

The drawings are merely schematic and are not to scale. Identical reference signs in the different drawings refer to identical or identically acting features.

DETAILED DESCRIPTION

Figure 1:
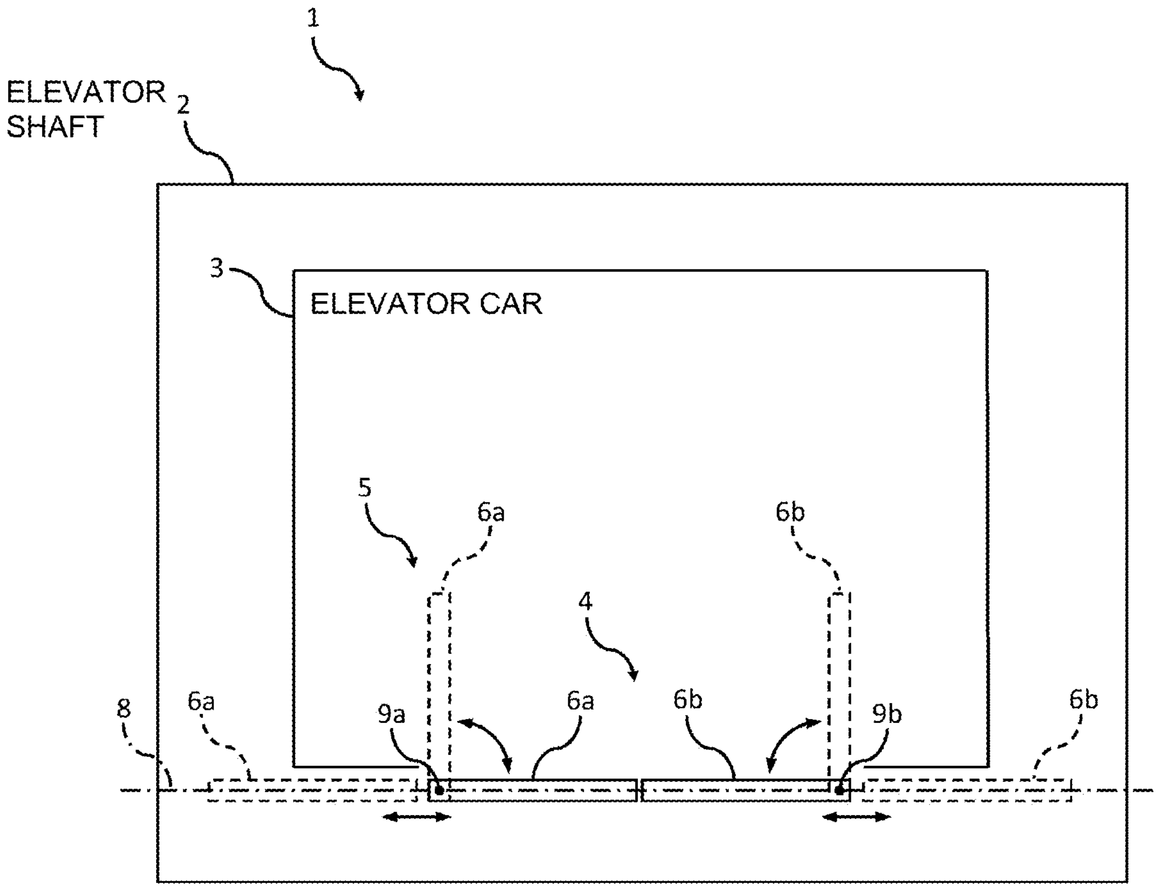
FIG. 1 shows an elevator system according to one embodiment of the invention from above.

FIG. 1 shows a plan view of an elevator system 1 with an elevator shaft 2, which connects several floors of a building to one another. An elevator car 3 movable between floors is arranged in the elevator shaft 2. The elevator car 3 has a car opening 4, which is closable by means of a door system 5.

In this example, the door system 5 comprises a first door leaf 6*a* and a second or further door leaf 6*b*, which are mounted slidably in opposite directions along a horizontal sliding axis 8, in each case between an open position, in which the car opening 4 is released by both door leaves 6*a*, 6*b*, and a closed position, in which the car opening 4 is closed by both door leaves 6*a*, 6*b*.

In addition, the first door leaf 6*a* is mounted rotatably about a vertical first rotation axis 9*a* and the second door leaf 6*b* is mounted rotatably about a vertical second rotation axis 9*b*, in such a way that each door leaf 6*a*, 6*b*, when it is blocked in the closed position and/or in an intermediate position between the open position and the closed position, for example due to a support running in the elevator shaft 2, can be rotated in an emergency into an emergency open position in which the car opening 4 is released to such an extent that people can leave the elevator car 3 via the car opening 4.

For example, in the emergency open position of one of the or both door leaves 6*a*, 6*b*, the car opening 4 can have a width of at least 20 cm, preferably of at least 35 cm or at least 50 cm. For this purpose, the door leaf 6*a*, 6*b* or the door leaves 6*a*, 6*b* can be rotatable about the rotation axis 9*a* or 9*b*, for example, by at least 20°, preferably by at least 40°, at least 60° or at least 80°.

The rotation axes 9*a*, 9*b* can intersect the sliding axis 8, as shown here. Alternatively, one or both of the rotation axes 9*a*, 9*b* can be offset horizontally to the sliding axis 8.

Each door leaf 6*a*, 6*b* can, for example, be pivoted at least partially into the elevator car 3 by rotating about its rotation axis 9*a* or 9*b*.

FIG. 1 shows the two door leaves 6*a*, 6*b* in the closed position, wherein the open position and emergency open positions of the door leaves 6*a*, 6*b* are indicated by dashed lines.

Figure 2:
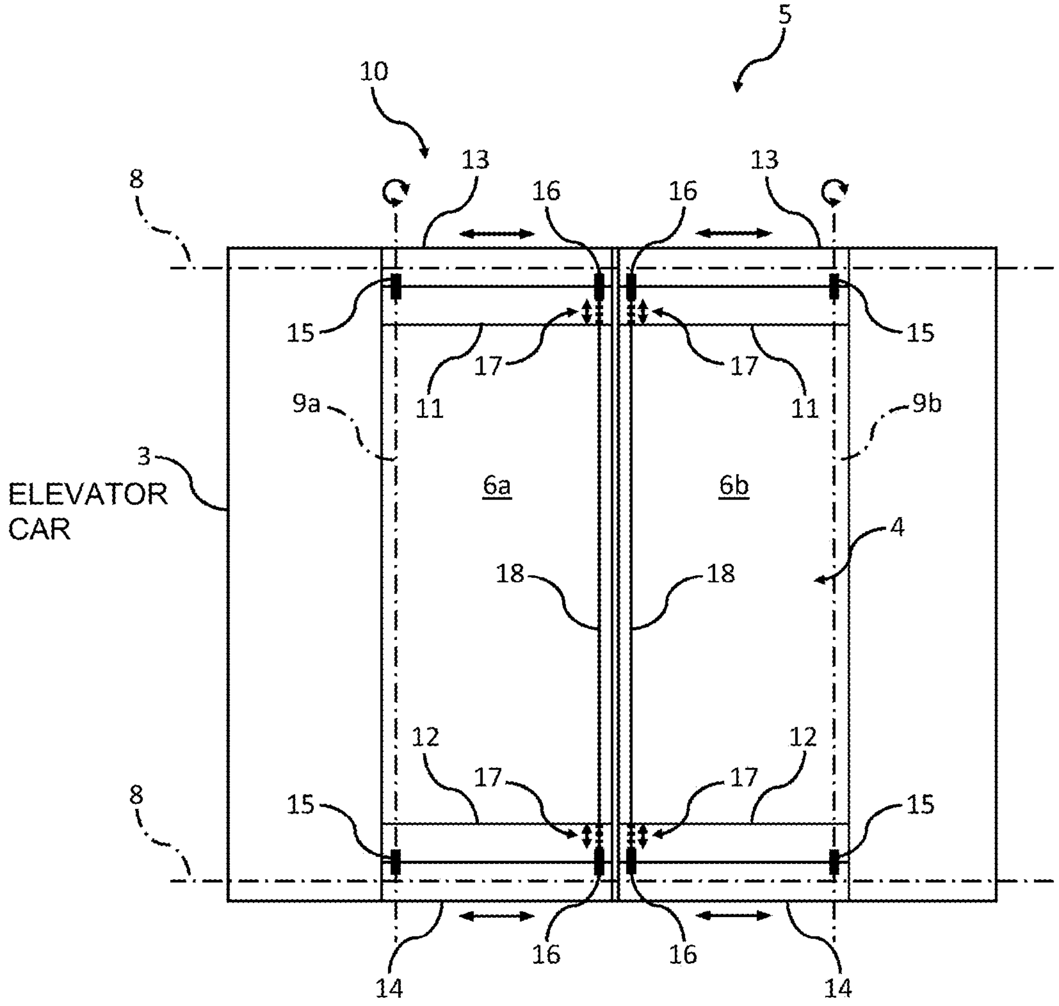
FIG. 2 shows an elevator car of the elevator system of FIG. 1 from the front.

FIG. 2 shows a front view of the elevator car 3 with details of a mounting device 10, via which the two door leaves 6*a*, 6*b* are slidably and rotatably mounted on the elevator car 3.

In this example, the mounting device 10 comprises an upper folding part 11 and a lower folding part 12 as well as an upper sliding part 13 and a lower sliding part 14 for each door leaf 6*a*, 6*b*. The upper sliding parts 13 can be mounted above the car opening 4 and the lower sliding parts 14 can be mounted below the car opening 4 on the elevator car 3 slidably along the sliding axis 8 between the open position and the closed position.

For example, the sliding parts 13, 14 can be designed as guide shoes, which can be guided by corresponding guide rails on the elevator car 3.

Each upper folding part 11 is on the one hand mounted on one of the upper sliding parts 13 rotatably about the rotation axis 9*a* or 9*b* and is on the other hand fastened to an upper end of one of the two door leaves 6*a*, 6*b*.

Analogously, each lower folding part 12 is on the one hand mounted on one of the lower sliding parts 14 rotatably about the rotation axis 9*a* or 9*b* and is on the other hand fastened to a lower end of one of the two door leaves 6*a*, 6*b*.

The door leaves 6*a*, 6*b* are thus rotatable together with the corresponding folding parts 11, 12 about the corresponding rotation axis 9*a*, 9*b*, wherein the upper folding parts 11 are slidable together with the corresponding upper sliding part 13, and the lower folding parts 12 are slidable together with the corresponding lower sliding part 14.

The folding parts 11, 12 can, for example, be screwed and/or welded to the corresponding door leaf 6*a*, 6*b*. However, the folding parts 11, 12 can also be designed as correspondingly shaped portions of the corresponding door leaf 6*a*, 6*b*.

The folding parts 11, 12 and/or the sliding parts 13, 14 can be designed, for example, as elongate profiles, angles or strips.

In the example shown in FIG. 2, the folding parts 11, 12 each extend over the entire width of the corresponding door leaf 6*a*, 6*b*. However, the folding parts 11, 12 can also extend only partially in the width direction and/or at least partially in the height direction of the door leaves 6*a*, 6*b*, for example in order to form a frame around the corresponding door leaf 6*a*, 6*b*.

Each folding part 11, 12 can, for example, be rotatably mounted about the rotation axis 9*a* or 9*b* at its first end (here adjacent to a side edge of the car opening 4) via a mounting bolt 15 which extends from the folding part 11, 12 into the adjacent sliding part 13 or 14.

In addition, each folding part 11, 12 can be lockable at its second end, opposite the first end in the horizontal direction, via a locking bolt 16 to the corresponding sliding part 13 or 14.

FIG. 2 shows the locking bolt 16 of each door leaf 6*a*, 6*b* in the locked state, in which the locking bolt 16 engages both in the corresponding folding part 11, 12 and in the corresponding sliding part 13, 14 and thus prevents rotation of the corresponding folding part 11, 12, i.e., of the corresponding door leaf 6*a*, 6*b*, into the emergency open position.

For example, each locking bolt 16 can be mounted vertically slidably between an unlocking position, in which the locking bolt 16 is completely moved out of the corresponding folding part 11, 12, and a locking position, in which the locking bolt 16 engages partially in the corresponding folding part 11, 12.

In addition, the locking bolt 16 can be coupled to a spring mechanism 17, which applies a restoring force, acting in the direction of the locking position, to the locking bolt 16.

Each locking bolt 16 can optionally be connected to an elongate traction means 18, for example a rope or wire, wherein the locking bolt 16 is slidable into the unlocking position by pulling on the traction means 18.

As shown by way of example in FIG. 2, the two locking bolts 16 of the same door leaf 6*a* or 6*b* can be connected to different ends of the same traction means 18. By pulling on the traction device 18, both locking bolts 16 can be slid into the unlocking position at the same time (when the traction means 18 is released, the locking bolts 16 move back into the locking position by themselves due to the restoring force).

Alternatively, the position of the mounting bolts 15 can be swapped with the position of the locking bolts 16.

Finally, it should be noted that terms such as "having," "comprising," etc. do not exclude other parts or steps, and indefinite articles such as "a" or "an" do not exclude a plurality. Furthermore, it should be noted that features or steps described with reference to one of the above embodiments can also be used in combination with features or steps described with reference to other of the above embodiments.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. A door system for an elevator car, wherein the elevator car is movable in an elevator shaft between several floors and has a car opening, the door system comprising:

a door leaf adapted to close at least a partial region of the car opening when mounted on the elevator car;

a mounting device adapted to mount the door leaf on the elevator car for slidable movement of the door leaf in a direction of a sliding axis between an open position, in which the door leaf releases the partial region, and a closed position, in which the door leaf closes the partial region, the mounted door leaf being additionally rotatable about a rotation axis so that the door leaf when in the closed position and/or in an intermediate position between the open position and the closed position is rotatable into an emergency open position in which the door leaf is pivoted into the elevator car and the car opening is released such that the elevator car can be evacuated through the car opening;

wherein the mounting device includes a folding part and a sliding part; and wherein the sliding part is adapted to mount on the elevator car to slide in the direction of the sliding axis between the open position and the closed position, wherein the folding part is mounted on the sliding part to rotate about the rotation axis such that the folding part is slidable together with the sliding part, and wherein the door leaf is fastened to the folding part such that the door leaf is rotatable together with the folding part.

2. The door system according to claim 1 wherein the folding part is elongate and has a first end rotatably connected to the sliding part.

3. The door system according to claim 1 wherein the folding part is rotatably connected to the sliding part by a mounting bolt that engages partially in the folding part and partially in the sliding part.

4. The door system according to claim 1 wherein the folding part, in a locked state, is locked to the sliding part preventing rotation of the folding part about the rotation axis, and the folding part, in an unlocked state, is rotatable about the rotation axis.

5. The door system according to claim 4 including a locking bolt selectively locking the folding part to the sliding part, wherein the locking bolt in the locked state engages partially in the folding part and partially in the sliding part and the locking bolt in the unlocked state does not engage in the folding part and/or does not engage in the sliding part.

6. The door system according to claim 5 wherein the folding part is elongate and has a first end rotatably connected to the sliding part, and the locking bolt engages partially in a second end of the folding part in the locked state.

7. The door system according to claim 5 wherein the locking bolt is displaceable between an unlocking position in the unlocked state and a locking position in the locked state, and including a spring mechanism coupled to the locking bolt, the spring mechanism applying a restoring force acting to move the locking bolt to the locking position.

8. The door system according to claim 7 wherein the locking bolt is connected to an elongate traction means, the locking bolt being displaceable from the locking position into the unlocking position by pulling on the traction means.

9. The door system according to claim 1 wherein the mounting device includes a further folding part and a further sliding part, wherein the further sliding part is adapted to mount on the elevator car to slide in the direction of the sliding axis between the open position and the closed position, wherein the further folding part is mounted on the further sliding part to rotate about the rotation axis such that the further folding part is slidable together with the further sliding part, and wherein the door leaf is fastened at a first end to the folding part and at a second end to the further folding part such that the door leaf is rotatable together with the folding part and the further folding part.

10. The door system according to claim 1 including a further door leaf adapted to close a further partial region of the car opening when mounted on the elevator car, and wherein the mounting device is adapted to mount the further door leaf on the elevator car for slidable movement of the further door leaf in the direction of the sliding axis between an open position, in which the further door leaf releases the further partial region, and a closed position, in which the further door leaf closes the further partial region, and/or the mounted further door leaf is rotatable about a further rotation axis parallel to the rotation axis.

11. An elevator system comprising:

an elevator shaft;

an elevator car movable in the elevator shaft between several floors and having a car opening; and the door system according to claim 1 mounted on the elevator car at the car opening, the door being slidable in the direction of the sliding axis between the open position and the closed position and being rotatable about the rotation axis.

12. A method for evacuating the elevator car of the elevator system according to claim 11, the method comprising the steps of:

sliding the door leaf into the closed position and/or an intermediate position between the open position and the closed position;

rotating the door leaf about the rotation axis into the emergency open position to release the car opening for evacuation of the elevator car through the car opening.

13. The method according to claim 12 wherein the folding part, in a locked state, is locked to the sliding part preventing rotation of the folding part about the rotation axis, and the folding part, in an unlocked state, is rotatable about the rotation axis, and including unlocking the door leaf by unlocking the folding part and then rotating the door leaf into the emergency open position.

14. The method according to claim 12 wherein the door leaf is pivoted into the elevator car when rotated into the emergency open position.

15. The method according to claim 12 wherein the rotation axis is a vertical axis.

16. A door system for an elevator car, wherein the elevator car is movable in an elevator shaft between several floors and has a car opening, the door system comprising:

a first door leaf and a second door leaf each adapted to close at least an associated partial region of the car opening when mounted on the elevator car;

a mounting device for each of the door leaves adapted to mount the door leaves on the elevator car for slidable movement of the door leaves in a direction of a sliding axis between an open position, in which each of the door leaves releases the associated partial region, and a closed position, in which each of the door leaves closes the associated partial region;

wherein the mounted first door leaf is additionally rotatable about a rotation axis so that the first door leaf when in the closed position and/or in an intermediate position between the open position and the closed position is rotatable into an emergency open position in which the first door leaf is pivoted into the elevator car and the car opening is released such that the elevator car can be evacuated through the car opening;

wherein the mounting device adapted to mount the first door leaf includes a folding part and a sliding part; and wherein the sliding part is adapted to mount on the elevator car to slide in the direction of the sliding axis between the open position and the closed position, wherein the folding part is mounted on the sliding part to rotate about the rotation axis such that the folding part is slidable together with the sliding part, and wherein the first door leaf is fastened to the folding part such that the first door leaf is rotatable together with the folding part.

17. The door system according to claim 16 wherein the first door leaf and the second door leaf form a telescopic sliding door with the first door leaf being frontmost.

* * * * *